United States Patent Office 2,695,326
Patented Nov. 23, 1954

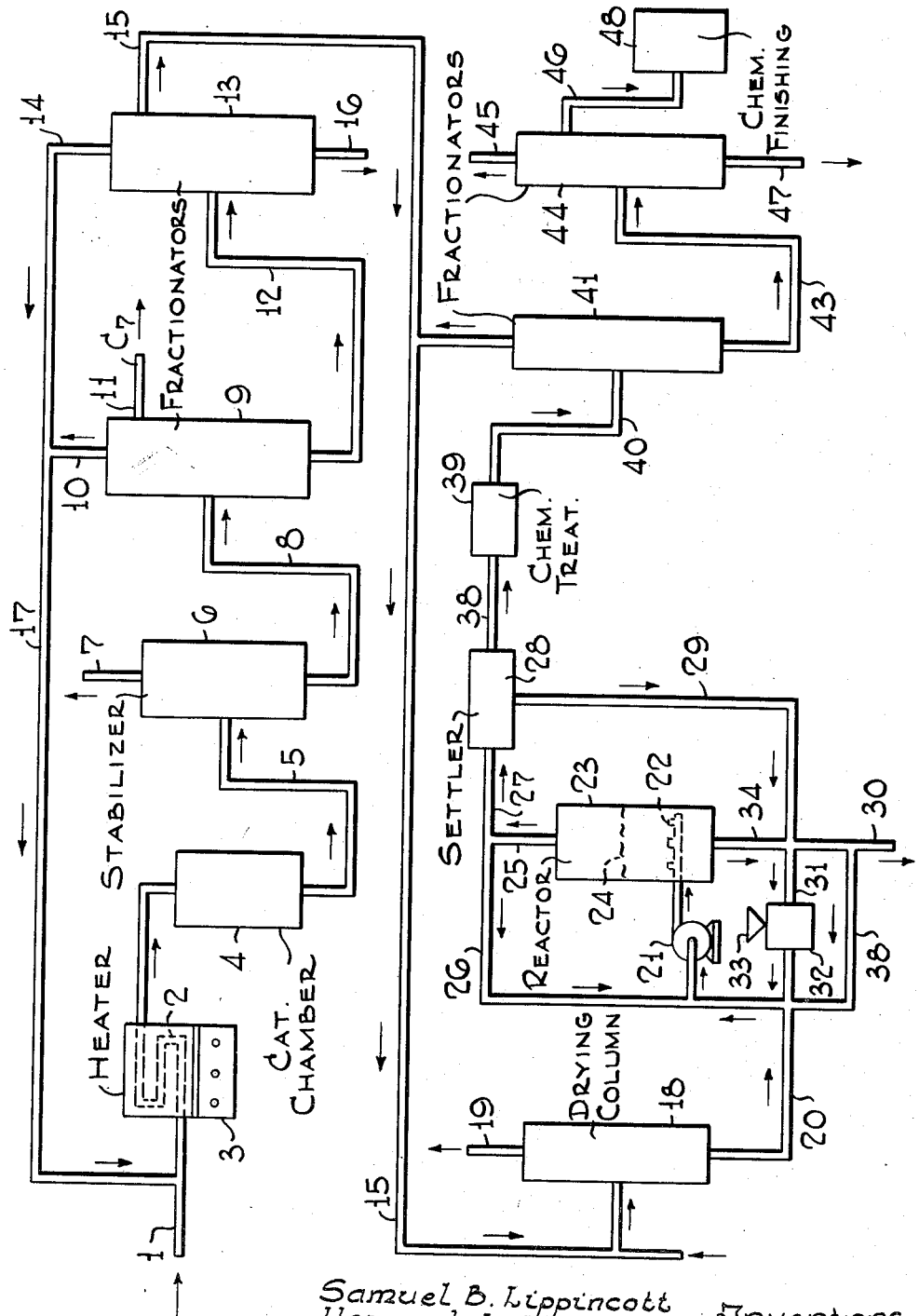

2,695,326

C₁₁ TO C₁₃ COPOLYMERS OF PROPENE AND n-BUTENE

Samuel B. Lippincott and Howard L. Yowell, Westfield, N. J., assignors to Standard Oil Development Company, a corporation of Delaware Application June 28, 1950, Serial No. 170,748

3 Claims. (Cl. 260—683.15)

This invention relates to a process for producing water-soluble type alkyl aromatic sulfonate detergents of high quality with desired economies using polymers of mixed propene-butene feeds to obtain the alkyl substituent.

Desired advantages to be obtained with the present invention are dependent upon the following factors:

It is not essential to obtain $C_{12}$ olefin polymers from pure propene, which is expensive and of limited availability, for the alkylation of the aromatic compounds, because suitable polymers for this purpose can be made from propene-butene mixtures, in which the propene is properly proportioned to normal butenes and isobutene.

In polymerizing the propene-butene mixture, steps can be taken to control the reaction and recycling of certain product fractions to obtain improved yields of $C_{11}$ to $C_{13}$ copolymers best suited for alkylating aromatic hydrocarbons, such as, benzene, with least chain fragmentation, more particularly by use of proper polymerization conditions, contact time, and elimination of $C_7$ polymer products from the recycled products.

The alkylation of the aromatic hydrocarbons with $C_{11}$ to $C_{13}$ propene-butene polymers can be carried out satisfactorily and inexpensively with an aluminum chloride sludge catalyst or other active alkylation catalysts at low temperatures with low fragmentation.

The copolymer alkylated aromatic hydrocarbon product properly fractionated can be practically 100% sulfonated to yield the desired alkyl aromatic sulfonate products which are substantially as good as those obtained from polymers of pure propene in soft waters and even surpass them in certain respects, such as detergency, in hard water.

The process steps involved will be briefly and generally described with reference to the accompanying flow diagram and the controlling features will be explained more fully.

The polymerization step is carried out with a phosphoric acid catalyst in a manner similar to the known commercial processes of producing gasoline, but preferably with modifications for obtaining high yields of the desired $C_{11}$–$C_{13}$ olefin polymers to be used in producing the detergents. These desired polymers are chiefly characterized by high bromine numbers ranging from 88 to 104 and normal boiling points of 360° F. to 425° F.

The propene-butene charging stock containing very little water, e. g. about .01 to .5 mole percent, is introduced under pressure by line 1 through heating coil 2, which receives heat from heater 3, into a catalyst chamber 4 containing the phosphoric acid catalyst.

The feed containing the alkenes under a pressure of between 100 and 2000 p. s. i. g. is preheated to temperatures in the range of 250°–450° F. for contact with the catalyst in chamber 4. The phosphoric acid catalyst is preferably used on adsorbent carriers, such as kieselguhr, alumina, diatomaceous earth, or silica, on which it is precalcined at about 400°–500° F. The catalyst tends to lose activity by undergoing complete dehydration, therefore, a small amount of water or steam is added to the charging stock, e. g. to maintain the activity. The polymerization reaction is exothermic and heat is removed, if necessary from the reaction zone to maintain the desired reaction temperature in the range of 350°–500° F.

From the reaction chamber 4, the resulting product mixture of polymers and unreacted hydrocarbons is withdrawn through line 5 to a product recovery unit comprising a stabilizer 6 in which gaseous hydrocarbons, including $C_2$–$C_5$ unreacted hydrocarbons are separated from the polymers. The polymers condensed to liquid and stabilized are passed by line 8 to a fractionator 9 for separating by line 10 a $C_6$–$C_7$ (110° F.–160° F.) light fraction, a $C_7$–$C_8$ (160° F.–225° F.) intermediate fraction withdrawn through line 11, and a $C_8+$ bottoms fraction. The $C_8+$ bottoms fraction is passed by line 12 into another fractionator 13, where a $C_8$–$C_{11}$ (225° F.–360° F.) light fraction is removed through line 14, a $C_{11}$–$C_{13}$ (360° F.–425° F.) fraction is removed by line 15 and a $C_{13}+$ heavy fraction is removed by line 16. As will be explained later, the fractions of $C_6$–$C_7$ and $C_8$–$C_{11}$ hydrocarbons removed from fractionators 9 and 13 through 10 and 14 are best adapted for recycling, as through line 17 to the polymerization reaction zone 4, the intermediate $C_7$–$C_8$ and $C_{11}$–$C_{13}$ cuts being removed from the polymerization unit as final products. The polymers may be fractionated under reduced pressure, but the boiling points given are corrected to atmospheric pressure.

While, in general, the process of polymerizing the propene-butene feed, as described, is similar to the known processes of polymerizing the $C_3$–$C_4$ alkenes to form gasoline or of polymerizing substantially pure propene to form $C_6$, $C_9$, $C_{12}$ and higher polypropenes, it has now been found that there are certain significant differences when it is desired to obtain detergent alkylates in starting with the polymerization of propene-butene mixtures. For instance, in polymerizing $C_3$–$C_4$ alkene mixtures to produce gasoline and preferably anti-knock gasoline, it is desirable to have present in the feed as large a proportion of isobutene as possible in order to obtain a large yield of highly branched $C_6$–$C_{12}$ hydrocarbons. The increased proportion of isobutene makes the optimum polymerization temperature relatively lower, of the order of 300° F.–400° F., and the product which is best to recycle contains the $C_{13}+$ polymers. In such operations the principal product is made up of $C_8$ branched olefins, i. e. isooctenes, and triisobutene polymers that boil below 360° F. If substantially pure propene, with not more than about 1% or 2% butenes present, the optimum polymerization temperature is of the order of 400° F.–450° F., the product is largely the $C_9$, propene trimers, in a proportion of about 40–50 volume percent of total polymer with a minimum of $C_7$ product.

On the other hand, when using the propene-butene feed to obtain particularly the $C_{11}$–$C_{13}$ polymers (360° F.–425° F.) desired for making detergent alkylates, it is advantageous to have present in the olefin feed between 22 and 8.7 mole percent of normal butenes 67–87 mole percent propene and less than 11 mole percent isobutene. With this type of feed the optimum reaction temperature range is 425° F.–475° F. This kind of feed forms larger amounts of $C_7$ and $C_{10}$ olefins rather than $C_8$ or $C_9$ olefins and in addition forms substantial amounts of high boiling $C_{11}$ and low boiling $C_{13}$ copolymers boiling in the range of 360° F. to 425° F. which can be suitably used with the $C_{12}$ olefins for mono-alkylating aromatics in preparing satisfactory detergent alkylates while keeping the $C_7$ product within certain limits. In using this type of feed, it was found that advantageously the $C_7$ cut or a $C_7$–$C_8$ fraction cut should not be recycled but should be removed from the system to be used for any other desired purpose, while the $C_6$ and $C_8$–$C_{11}$ cuts can be usefully recycled to improve the desired yields of $C_{11}$–$C_{13}$ olefin polymers. Thus, by eliminating a $C_7$ cut such as boils in the temperature range of 160° F.–225° F., or more particularly from about 168° F. to 210° F., from the recycled polymer, improved yields of desired $C_{11}$–$C_{13}$ polymers are obtained. Operation studies have definitely shown that with increased amounts of $C_7$ olefins present there is a marked decrease in the amounts of $C_9$ polymers and similarly a decrease in the desired $C_{11}$–$C_{13}$ polymers.

TABLE I

VOLUME PER CENT POLYMER PRODUCT DISTRIBUTION IN EQUILIBRIUM

*Polymerization of $C_3$–$C_4$ alkenes*

[Phosphoric acid cat.; 1,000 p. s. i. g.; 0.38 gal./hr./lb./feed rate; 450° F.]

| $C_6$ | $C_7$ | $C_8$ | $C_9$ | $C_{10}$ | $C_{11}$–$C_{13}$ |
|---|---|---|---|---|---|
| 5 | 25 | 18 | 20 | 23 | 9 |
| 8 | 20 | 14 | 24 | 20 | 14 |
| 9 | 10 | 11 | 38 | 16 | 15 |

The above data on the equilibrium mixtures were obtained in the polymerization of feeds containing from between 10 and 3 moles propene per mole of n-butene and show that optimum yields of the desired $C_{11}$ to $C_{13}$ polymers are formed in the presence of restricted amounts of $C_7$ polymers, preferably by restricting the proportion of the $C_7$ polymers (boiling in the range of 168° F. to 210° F.) to between 10 and 20 vol. percent.

In controlling the polymerization to obtain maximum yields of $C_{11}$–$C_{13}$ copolymers, it has been observed that the $C_7$ copolymers have the tendency of reacting with $C_3$ olefin, propene, to form $C_{10}$ copolymers, therefore, while elimination of $C_7$ copolymers from any recycled polymer feed aids in lowering this undesired reaction, other controls can also be employed, such as use of optimum reaction temperatures in the range of 425° F. to 475° F. and proper conversion levels, e. g., between about 85% and 95%.

The following tabulated data illustrates a comparison of feeds and their products under exemplary polymerization conditions:

TABLE II

*Phosphoric acid catalyst polymerization*

[1,000 p. s. i. g.; 0.32 gal./hr./lb. feed rate; reaction temp., 450° F.]

| | I<br>Propene feed, mole percent | II<br>Propene-n-butene feed, mole percent | III<br>Propene-n-butene-isobutene feed, mole percent |
|---|---|---|---|
| Feed compositions: | | | |
| Propene | 40.6 | 31.3 | 21.3 |
| Propane | 58.8 | 59.6 | 5.7 |
| Butanes | | 0.4 | 46.2 |
| n-Butenes | | 8.1 | 17.3 |
| Isobutenes | | 0.0 | 8.9 |
| $C_5$+ | 6.6 | 0.5 | 0.6 |
| Olefin conversion, weight percent based on olefins: | | | |
| Propene | 88 | 96 | 98 |
| n-butenes | | 94 | 86 |
| Isobutene | | | 97 |
| Total olefins | 88 | 95 | 93 |
| Polymer yield | 86 | 93 | 90 |
| Selectivity | 98 | 98 | 97 |
| Polymer products, volume percent: | | | |
| $C_6$ (I. B. P. 168° F.) | 5.9 | 7.7 | 4.3 |
| $C_7$ (168°–210° F.) | 4.6 | 17.9 | 28.7 |
| $C_8$–$C_{11}$ (210° F.–375° F.) | 73.8 | 56.6 | 55.4 |
| $C_{12}$ (375°–415° F.) | 12.9 | 11.4 | 7.9 |
| $C_{13}$ (415° F.+) | 2.8 | 6.4 | 4.0 |
| $C_{11}$–$C_{13}$ (360°–425° F.) | 13.3 | 15.0 | 8.5 |

The foregoing data shows how a substantially butene-free propene feed I tends to produce very little $C_7$ polymer while the mixed feed III containing substantial amounts of isobutene produces excessively large amounts of $C_7$ polymers and relatively little $C_{12}$ or $C_{11}$–$C_{13}$ polymers. The polymer product from the propene feed I substantially free of n-butene on being distilled shows more pronounced distillation plateaus for the $C_6$, $C_9$, and $C_{12}$ polymers; and although it has a larger percentage of precisely $C_{12}$ polymers, it has a lower total suitable $C_{11}$–$C_{13}$ polymer cut (360° F.–425° F.) than the polymer product of the propene-n-butene feed II. In using the $C_{12}$ polymers from each of the products for alkylating benzene and sulfonating the resulting alkylate, it was noticed that the final products obtained from the $C_{12}$ polymers of the mixed propene-n-butene feed contained less unsulfonated oil in the sulfonated product, of the order of 1.2 weight percent, as compared to about 2 weight percent from the pure propene feed and 1.8 weight percent from the feed containing substantial amounts of isobutene.

The $C_{11}$–$C_{13}$ polymers of the propene-n-butene feed may be used to mono-alkylate aromatic compounds, such as benzene or toluene, naphthalene, and other aromatic hydrocarbons, to known methods, employing $H_2SO_4$, $BF_3$, anhydrous HF, or $AlCl_3.CHCl_3$ complex as catalysts, but the preferred alkylation process uses an aluminum chloride complex catalyst which is a viscous liquid nearly insoluble in the hydrocarbon products, thus making it easy to separate, to handle and avoid corrosion difficulties. The aluminum chloride complex catalyst is typically composed of about 38–42 weight percent aluminum chloride combined with olefin polymers and the aromatic hydrocarbons with only about 1% free aluminum chloride present when the catalyst is active. As the catalyst becomes spent, its content of aluminum chloride becomes diminished. The spent catalyst is readily reactivated by admixing fresh aluminum chloride.

To carry out the alkylation, the $C_{11}$–$C_{13}$ polymers are first dried in any suitable manner, for example, by mixing with the aromatic hydrocarbon reactant and distilling the water azeotropically or by treatment with a chemical drier, such as calcium chloride or alumina.

As shown in the drawing, the polymer feed from the fractionator 13 is delivered by line 15 to the fractionating or drying column 18, where, mixed with the aromatic compound, the water is removed overhead by line 19; and the dried reactant feed mixture is passed by line 20 and pump 21 for discharge through jets 22 at the bottom of the alkylation reactor 23. With an excess molar proportion of the aromatic reactant present the olefin reactant substantially instantaneously reacts on coming into contact with the active complex catalyst which settles as a liquid mass at the bottom of the reactor 23. The alkylated product formed together with unreacted aromatic reactant passes upwardly above the liquid catalyst level 24 and is withdrawn through line 25. Any desired proportion of this withdrawn product can be recycled through line 26 for supplying part of the aromatic reactant required. A remaining portion of the polymer product is led by line 27 into a settler 28 for removing any small amount of the catalyst entrained, such separated catalyst is removed from separator 28 by line 29 either to be discarded through line 30 as spent catalyst or be passed by line 31 into a catalyst make-up tank 32 where fresh aluminum chloride is admixed from hopper 33. Catalyst can be withdrawn from any part of reactor 23, e. g. by line 34 to be discarded through line 30 or to be passed into tank 32 by line 31 or to be recycled through line 38.

The general operation conditions for the alkylation reaction are: temperatures of 35° F. to 115° F.; an aromatic reactant to olefin reactant volume ratio of at least 2:1 and preferably about 5:1 or higher; a contact time of about 10 to 30 minutes; a catalyst sludge to hydrocarbon ratio in the reactor of about 0.1 to 1.0. Each of these conditions can be varied to beyond the limits mentioned but any large variation may tend to be adverse. For example, the highest yields of detergent alkylate are obtained at the lower reaction temperatures, the yield increasing from 80 to 91 volume percent in lowering the temperature from 115° F. to 40° F. due to the formation of less degradation products. At above 115° F., undesired fractionation reactions tend to occur. At below 35° F. there is a tendency for the aromatic reactant, e. g. benzene to become crystalline. The alkylation reaction is substantially instantaneous; therefore, the residence time of the reactants in contact with the catalyst can be as short as practical. Increasing the contact time tends to lower the yield of the desired alkylate. There are advantages to be gained by having the catalyst sludge to hydrocarbon ratio as low as possible for decreasing contact time and reducing cost of catalyst. The recycled product stream can vary from practically pure hydrocarbon (alkylate unreacted aromatic hydrocarbon) to 50% sludge, but it is advantageous to recycle the hydrocarbon product with very little sludge. The recycled aromatic reactant does not accumulate impurities to an appreciable extent. Typical plant operation data is set forth in the following table:

TABLE III

Summarized pilot plant data conditions:

| | |
|---|---|
| Reactor temperatures, °F. | 41 |
| Aromatic-olefin volume ratio | 5 |
| Hydrocarbon feed, liters/hr | 3.95 |
| $AlCl_3$ addition g./hr | 25 |
| HCl addition, weight percent on $AlCl_3$ | 27 |
| Water, weight percent on $AlCl_3$ | 0.2 |
| Recycled rate, liters/hr | 190 |
| Sludge-hydrocarbon ratio | 0.39 |

Total alkylate:

| | |
|---|---|
| Degradation product, vol. percent | 11 |
| Detergent alkylate, vol. percent | 73 |
| Polymer and heavy alkylate, vol. percent | 16 |

Yields based on olefin feed, vol. percent:

| | |
|---|---|
| Total alkylate | 125 |
| Detergent alkylate | 91 |
| Sludge product | 12 |

Using similar conditions in alkylating toluene with a propene-butene $C_{11}$–$C_{13}$ copolymer but using 115° F. reaction temperature a yield of 84% detergent alkylate was obtained. The pressures maintained in the reaction zone are moderate, e. g. 5 to 10 p. s. i. g.

The hydrocarbon product is withdrawn from the separator 28 by line 38 to a chemical treating unit 39 for removal of any entrained catalyst or acid, e. g. HCl. For this treatment caustic washing followed by water washing may be used or filtering through adsorbents such as bauxite or clay to obtain a neutral hydrocarbon product of close to zero bromine number.

The purified hydrocarbon product is passed by line 40 into a fractionator 41 for stripping out the unreacted aromatic compound, which taken overhead by line 42 can be mixed with the polymer to form fresh feed. The alkylate product is passed by line 43 into another fractionator 44 to strip out the light alkylate (degradation product) boiling below 518° F. as overhead product removed by line 45. The desired alkylate fraction boiling in the range of 518° F.–680° F. is separated as an intermediate fraction such as a side stream removed by line 46. The residual heavy alkylate is removed as bottoms by line 47.

The finishing treatment of the alkylate for obtaining the sulfonate detergents is of no particular concern to the present invention, since the alkylate obtained with the use of the aluminum chloride complex catalyst is not contaminated with excessive amounts of unsulfonatable materials and is readily sulfonated to practically 100% using conventional sulfonation methods. The presence of more than about 1.5% unsulfonatable material, such as polymer tends to make the alkylate unstable with respect to color and forms unsaponifiable material which lowers the quality of the detergents produced. The alkylate may be subjected to chemical treatments such as bleaching with sodium hypochlorite or washing with sulfuric acid and passing over activated clays to remove unsaturated compounds, but it is preferred to minimize the chemical treatment of the alkylate on account of the cost and losses of alkylate material. The finishing treatment and sulfonation is indicated to be conducted in unit 48. The sulfonation of the alkylates may be carried out with a variety of acid strengths, e. g. from 100% $H_2SO_4$ to oleum containing 20% $SO_3$ and liquid $SO_3$. The sulfonation temperature is higher for the weaker acids. Using 20% oleum in the amount of 1.4 times the weight of alkylate, the alkylate is stirred with the acid for a period of about 10 minutes while the temperature of the mixture is maintained below 77° F. Thereafter the temperature of the reaction product can be increased to 131° F., and then the reaction mixture can be quenched by addition of cold water and 30% sodium hydroxide solution, keeping the temperature below 140° F. Sufficient sodium sulfate is added to bring the concentration of the active ingredient to 40% by weight and the mixture is dried in a stainless steel drum drier using 60 lb. steam pressure or is spray dried. This is a standardized procedure when only a trace of hydrocarbon material remains in the finished product. If the product contains a substantial amount of unsulfonated oil it has to be subjected to a deoiling, such as by means of extraction or chemical treatment prior to the drying.

Using the described standardized procedure of sulfonating and recovering the finished detergents, analyses, and detergency evaluations were made on a comparative basis to find the effect of the n-butenes in the copolymer alkylate with reference to an alkylate formed from a substantial pure propylene polymer. Each of the olefin feeds subjected to phosphoric catalyst polymerization in the manner contained a trace of less than 1% isobutene and usual amounts of inert paraffins; therefore, the feed composition is given on the basis of total olefins. The comparable data is summarized in the following table.

TABLE IV

*Comparison of sulfonate products variation of n-butene in polymerized feed*

| Tests | 1 | 2 | 3 |
|---|---|---|---|
| Feed to polymerization unit: | | | |
| Percent propene | 98 | 91 | 80 |
| Percent n-butene | 2 | 9 | 20 |
| (On total olefin basis). | | | |
| Sulfonate yield, mole percent on alkylate | 100 | 100 | 100 |
| Unsulfonated oil, weight percent on alkylate | 2.6 | 1.9 | 1.2 |
| Color of dry powder | (²) | (²) | (²) |
| Launderometer evaluations: | | | |
| Soil removal ¹— | | | |
| 0.5 weight percent in distilled water | 80 | 70 | 90 |
| 0.5 weight percent in 120 p. p. m. hard water | 105 | 100 | 125 |
| 0.5 weight percent in 360 p. p. m. hard water | 80 | 100 | 105 |

¹ Soil removal relative to a commercially available sodium alkyl sulfate detergent at 0.5% in 120 p. p. m. hard water as 100.
² Near white.

The foregoing data illustrates the trend for the presence of the n-butene in the polymerization feed in giving an alkylate which shows better effectiveness as a detergent particularly in hard water. Each of the detergents gave similar full suds formation and stability.

For the purpose of the comparison shown in Table IV each of the polymers, the alkylate, and the sulfonate derivatives thereof, were formed under the same conditions using a precise $C_{12}$ polymer cut boiling from 375° F.–415° F. for the alkylation of benzene and a precise $C_{12}$ alkylate cut boiling in the range of 536° F.–626° F. On this basis the polymers of substantially pure propylene tend to give a substantially higher yield of detergent alkylate regardless of the kind of alkylation catalyst used, for example either hydrogen fluoride or aluminum chloride. This is so mainly because the $C_{12}$ polymers of propylene more selectively form the $C_{12}$ alkylate, whereas the copolymers of propene-butenes, even boiling in the same range, tend to yield some $C_{11}$ and $C_{13}$ alkyl benzene. Hence, studies were undertaken to find out if the $C_{11}$ and $C_{13}$ alkyl benzene from the copolymers could be used to obtain sulfonate detergents of as high quality as the $C_{12}$ alkyl benzene sulfonate, thus permitting a wider alkylate cut to be used and thereby making the detergent alkylate yield from the copolymers as high as from the pure propylene polymers. These tests have definitely proved that the broader $C_{11}$–$C_{13}$ alkyl aromatic cuts give high quality sulfonates, especially adapted for use in hard water so that a broader detergent alkylate cut boiling from 518° F. up to 635° F. or even up to 680° F. can be satisfactorily used in place of the narrow 536° F.–608° F. cut which corresponds to the alkylate cut of tetrapropylene-benzene alkylate. The pertinent factors brought out in these studies are summarized in the following table:

TABLE V

*Comparison of various $C_{12}$ and $C_{11}$–$C_{13}$ polymers*

| Olefin polymers | Boiling Range, °F., 760 mm. hg | Br. g. $Br_2$/100 g. hydrocarbon number range [1] | Molecular weight, range |
|---|---|---|---|
| $C_{12}$ propene polymers | 375–415 | 98 –95.6 | 154–176 |
| $C_{12}$ propene-butene copolymers | 375–415 | 98.7–85 | 153–175 |
| $C_{11}$–$C_{13}$ propene-butene copolymers | 360–425 | 106 –82.6 | 147–182 |
| Theoretical for— | | | |
| $C_{11}H_{22}$ | | 104 | 154 |
| $C_{12}H_{24}$ | | 93 | 168 |
| $C_{13}H_{26}$ | | 88 | 182 |

[1] On total olefins.

The above table indicates the variation in ranges of the bromine numbers and of the molecular weights of the polymers, thus showing that the $C_{11}$–$C_{13}$ olefins are present in the wider cuts of the propene-butene copolymers. Using the wider alkylate fractions formed from the copolymers the yields were substantially the same as obtained from the tetrapropylene polymers, thus showing that the $C_{11}$–$C_{13}$ copolymers did not undergo any substantially larger amount of fragmentation than the tetrapropylene polymers during the alkylation under suitable alkylation conditions. The sulfonation of the alkylates formed from the $C_{11}$–$C_{13}$ copolymers was practically 100%.

The alkylate products from each type of polymer and copolymer were fractionated and separately sulfonated in order to compare the detersive quality of the resulting sulfonates in both soft and hard waters. These fundamental detergency studies clearly demonstrate that in comparing the $C_{11}$ with $C_{13}$ and $C_{12}$ alkyl aromatic sulfonates, the detergency of the sodium salts increases with increased molecular weight when tested in distilled water, but decreases with increasing molecular weight when tested in hard water, that is, when each particular sulfonate is tested alone. However, it was noted that there is a synergistic effect when the various sulfonates are blended which appears to be related to the wetting power of the sulfonate in combination with the detersive power, that is a function of the number and size of micelles in solution. Thus, while a shorter alkyl chain, e. g. $C_{11}$ decreases the tendency for the molecule to coalesce into micelles and the longer alkyl chain, e. g., $C_{13}$, decreases wetting power, each of these effects can be counterbalanced by a mixture of the sulfonates with shorter and longer alkyl chains. Another factor is the location of the benzene or aromatic ring on the alkyl chain and the degree of branching of the alkyl chain. As the ring is moved toward the center of the alkyl chain and as the alkyl chain is lengthened there is a lowering in surface tension of water; however, branching of the chain enhances the wetting power. These fundamental studies are believed to explain to some extent how the overall effects obtained with the sulfonates of wider boiling alkylates from the propene-butene copolymer detergents which were practically equal to the sulfonates from tetrapropylene ($C_{12}$) alkylates in soft water and are substantially better in hard waters. Comparable data are shown in the following table:

TABLE VI

*Launderometer evaluations of sulfonates from various alkylates*

SOIL REMOVAL TESTS WITH 0.5 WEIGHT PERCENT CONCENTRATION

| Nature of detergent alkylate | Relative soil removal [1]—Type of water used | |
|---|---|---|
| | Distilled water | 240 p. p. m. hard water |
| $C_{12}$ polypropene alkylate | 45 | 105 |
| $C_{12}$ butene-propene alkylate | 45 | 90 |
| $C_{11}$–$C_{13}$ butene-propene alkylate | 65 | 115 |

[1] Soil removal relative to a commercially available sodium alkyl sulfate detergent at 0.5% in 240 p. p. m. hard water as 100.

The data of Table VI illustrate how the alkylates formed from the copolymers of butene and propene tend to have higher detersive power in hard waters. This data is representative of results obtained from alkylates formed of propene-butene copolymers containing 3 to 10 moles of propene per mole of butene. The data also indicates the desirable synergistic effect obtained in having $C_{11}$ and $C_{13}$ copolymers present.

To summarize the principal features of this invention:

(1) It is advantageous to form the alkylating olefin polymers by copolymerizing propene with butene, preferably having 3 to 10 moles of propene per mole of normal butene and less than ½ mole isobutene present in the olefin feed.

(2) It is advantageous to enhance the yields of $C_{11}$–$C_{13}$ copolymers from the propene-butene feeds by recycling the $C_6$ and $C_8$–$C_{11}$ polymers with a $C_7$ polymer cut eliminated.

(3) In alkylating the aromatics with the coplymers of the propene-butene feeds, it is advantageous to use as the alkylate product for sulfonation a wide boiling fraction containing the $C_{11}$–$C_{13}$ alkyl aromatics having an initial boiling point in the range of 518° F.–530° F. and a final end point in the range of 630° F.–680° F. in order to obtain maximum yields of suitable sulfonate detergents of both high wetting and detersive power in soft and hard waters.

What is claimed is:

1. In a process for preparing $C_{11}$ to $C_{13}$ copolymers of propene and n-butene suitable as alkylating reactants for producing alkyl aromatic sulfonate detergents, the improvement which comprises copolymerizing an olefin mixture of propene and butenes containing principally propene and normal butene in a proportion of 3 to 10 moles of propene per mole of n-butene and less than ½ mole of isobutene per mole of n-butene in the presence of a phosphoric acid polymerization catalyst under polymerization conditions at 350° F. to 500° F., maintaining a polymer conversion yield of said olefin mixture at 85 to 95 weight per cent and preventing recycling of $C_7$ copolymers to hold the proportion of resulting $C_7$ copolymers formed in the resulting reaction mixture product within the range of 10 to 20 volume per cent of the total polymer product, and separating from the total polymer product a $C_{11}$ to $C_{13}$ copolymer fraction boiling in the range of 360° F. to 425° F. for use as alkylating reactants.

2. In a process for preparing $C_{11}$–$C_{13}$ copolymers of propene and n-butene suitable for use as alkylating reactants in preparing alkyl aromatic sulfonate detergents, the improvement which comprises copolymerizing 3 to 10 moles of propene with one mole of n-butene in a mixture thereof containing less than ½ mole of isobutene per mole of n-butene in the presence of a phosphoric acid catalyst under polymerization reaction conditions at temperatures in the range of 350° F. to 500° F., maintaining a polymer conversion yield of said olefin mixture at 85 to 95 weight per cent and preventing recycling of $C_7$ copolymers to hold resulting $C_7$ copolymers formed in the resulting reaction mixture product within the range of 10 to 20 volume per cent of total polymer product, separating from said polymer product a $C_7$ copolymer rich fraction boiling in the range of 160° F. to 225° F. and $C_{11}$ to $C_{13}$ copolymers boiling in the range of 360° F. to 425° F., and recycling remaining polymer product boiling below 360° F. from which said $C_7$ copolymer-rich fraction is eliminated.

3. In a process for producing $C_{11}$ to $C_{13}$ copolymers of propene and n-butene suitable for use as alkylating reactants to prepare alkyl aromatic sulfonate detergents, the improvement which comprises continuously feeding an olefin feed containing 67 to 87 mole per cent propene, between 22 and 8.7 mole per cent n-butene and less than 11 mole per cent isobutene under a pressure of 100 to 2000 p. s. i. g. into contact with a phosphoric acid polymerization catalyst in a polymerization reaction zone, maintaining a reaction temperature in the range of 425° F. to 475° F. in said reaction zone, continuously withdrawing from the reaction zone a resulting polymerization product containing between 10 and 20 volume per cent of $C_7$ copolymers, separating from the withdrawn polymerization reaction product $C_7$ copolymers boiling in the range of 168° F. to 210° F. and $C_{11}$ to $C_{13}$ copolymers boiling in the range of 360° F. to 425° F., recycling remaining polymeriaztion reaction products comprising $C_6$ and $C_8$ to $C_{11}$ olefin polymers freed of said $C_7$ copolymers to said reaction zone in maintaining reaction of 3 to 10 moles of propene with 1 mole of n-butene therein.

References Cited in the file of this patent

UNITED STATES PATENTS

| Number | Name | Date |
|---|---|---|
| 2,232,118 | Kyrides | Feb. 18, 1941 |
| 2,517,720 | Schaad | Aug. 8, 1950 |

OTHER REFERENCES

Ipatieff, Ind. and Eng. Chem., vol. 27, pages 1067–1069 (1935).